United States Patent

[11] 3,594,651

[72] Inventor Chester J. Wolejsza, Jr.
Rockville, Md.
[21] Appl. No. 866,676
[22] Filed Oct. 15, 1969
[45] Patented July 20, 1971
[73] Assignee Communications Statellite Corporation

[54] QUADRIPHASE MODEM
5 Claims, 5 Drawing Figs.

[52] U.S. Cl. 329/104, 178/66, 325/320, 329/122, 331/23, 325/419
[51] Int. Cl. H04l 27/22
[50] Field of Search 329/50, 104, 122, 1; 331/18, 23, 25; 325/30, 38 R, 38 A, 38 B, 320, 321, 419; 178/66, 88

[56] References Cited

UNITED STATES PATENTS 3,181,122 4/1965 Brown 331/18 X
3,336,534 8/1967 Gluth 331/25 X
3,479,457 11/1969 Oswald 178/66 X
3,525,945 8/1970 Puente 329/122 X

*Primary Examiner*—Alfred L. Brody
*Attorney*—Sughrue, Rothwell, Mion, Zinn & Macpeak

ABSTRACT: Apparatus responsive to a quadriphase modulated carrier generates a coherent reference signal having a fixed phase relation to the received carrier. The reference signal demodulates the received quadriphase modulated carrier. Prior to acquisition a phase-locked loop operates to lock the locally generated reference signal in phase with a received unmodulated portion of the carrier. Subsequent to acquisition the data detected by the demodulator remodulates the locally generated reference signal which is phase compared with the received quadriphase modulated carrier in the phase comparator of the phase-locked loop.

INVENTOR
CHESTER J. WOLEJSZA, JR

BY Sughrue, Rothwell, Mion, Zinn & Macpeak
ATTORNEYS

QUADRIPHASE MODEM

BACKGROUND OF THE INVENTION

The invention is the field of quadriphase modems and particularly relates to apparatus for receiving a quadriphase modulated carrier, generating a local reference carrier and demodulating the received quadriphase modulated carrier.

Quadriphase modulation and demodulation techniques are particularly suitable in transmission systems carrying large quantities of data. A particular advantage of quadriphase modems is that each symbol or carrier phase contains as much information as a pair of binary data bits. In transmitting bit streams between locations, the quadriphase technique results in a symbol rate which is one-half of the bit rate thereby reducing the bandwidth necessary to carry the information.

Typically, quadriphase modulation is carried out as follows:

A first train of data bits, representing a series of binary ones and zeros biphase modulates a carrier frequency. The phase representing a binary one data bit being 180° out of phase with that representing a binary zero data bit. The carrier frequency is shifted 90° and modulated by a second train of data bits. The first biphase output represents respectively the zero and 180° phases of the carrier whereas the second biphase output represents 90° and 270° phases of the carrier. The two biphase outputs are summed resulting in a quadriphase output signal. The quadriphase output signal has one of four possible phases, each representing a pair of data bits in a particular sequence. The two trains of data bits may be formed by applying a single bit stream to a serial-to-parallel bit converter, each output thereof having a bit rate equal to half the bit rate of the single input bit stream.

A primary consideration in any apparatus adapted to detect and demodulate a quadriphase modulated carrier is the generation of a carrier at the detector having a reference phase with which to compare the phase of received quadriphase modulated carrier.

In accordance with one technique, a constant reference phase carrier is transmitted along with the quadriphase modulated carrier. However, this requires an additional channel for transmission. Other techniques include: removing the modulation of the received carrier; squaring the received carrier and applying the output to a tuned circuit; and using a phase-locked loop technique with the locally generated carrier being remodulated by the detected data within the loop. Phase-locked loops have the advantage of generating a "clean" and coherent signal for use as a reference at the detector. However, the use of a phase-locked loop with remodulation results in a possible ambiguity because the loop may lock on anyone of four possible phases of the received carrier.

SUMMARY OF THE PRESENT INVENTION

In accordance with the present invention a locally generated reference carrier for use in demodulation of a quadriphase modulated carrier is derived from the received quadriphase modulated carrier by the use of phase-locked loop techniques. Prior to locking up, a voltage-controlled oscillator in a loop has its output connected directly to the phase detector of the loop. The loop thus locks up on the initial phase of the received carrier. It should be noted that the present invention operates on the assumption that the quadriphase modulated carrier is preceded by a short period of unmodulated carrier.

Once lock up or acquisition occurs a quadriphase modulator, referred to occasionally hereinafter as a remodulator, is inserted into the loop between the voltage-controlled oscillator and the loop phase detector. The locally generator reference carrier is applied to a demodulator which compares the phase of the received carrier with the reference carrier and with the reference carrier shifted by 90°, and provides a pair of bilevel outputs corresponding respectively to the two data bit streams at the transmission end of the modem. The two bilevel outputs from the demodulator remodulate the reference carrier and the reference carrier shifted by 90°, respectively. The remodulated signal is phase compared with the received carrier in the loop phase detector; the loop operating to maintain a constant phase relation between the latter two signals.

DETAILED DESCRIPTION OF THE DRAWINGS

Figure 2:
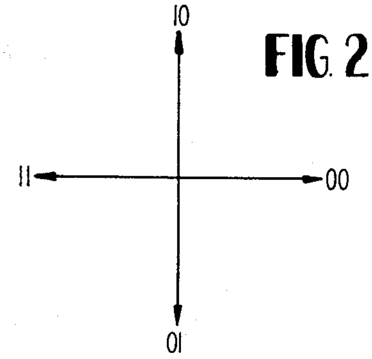
FIG. 2 is a phasor diagram representing the phase relation of the received carrier.

For the purpose of selecting a reference phase, the phase of the received carrier which represents the binary sequence 00, will hereinafter be designated as zero phase. This is illustrated in FIG. 2, wherein the plus 90° phase of the received carrier represents the binary sequence 10, the plus 180° phase of the received carrier represents the binary sequence 11, and the plus 270° phase of the carrier represents the binary sequence 01.

Figure 1:
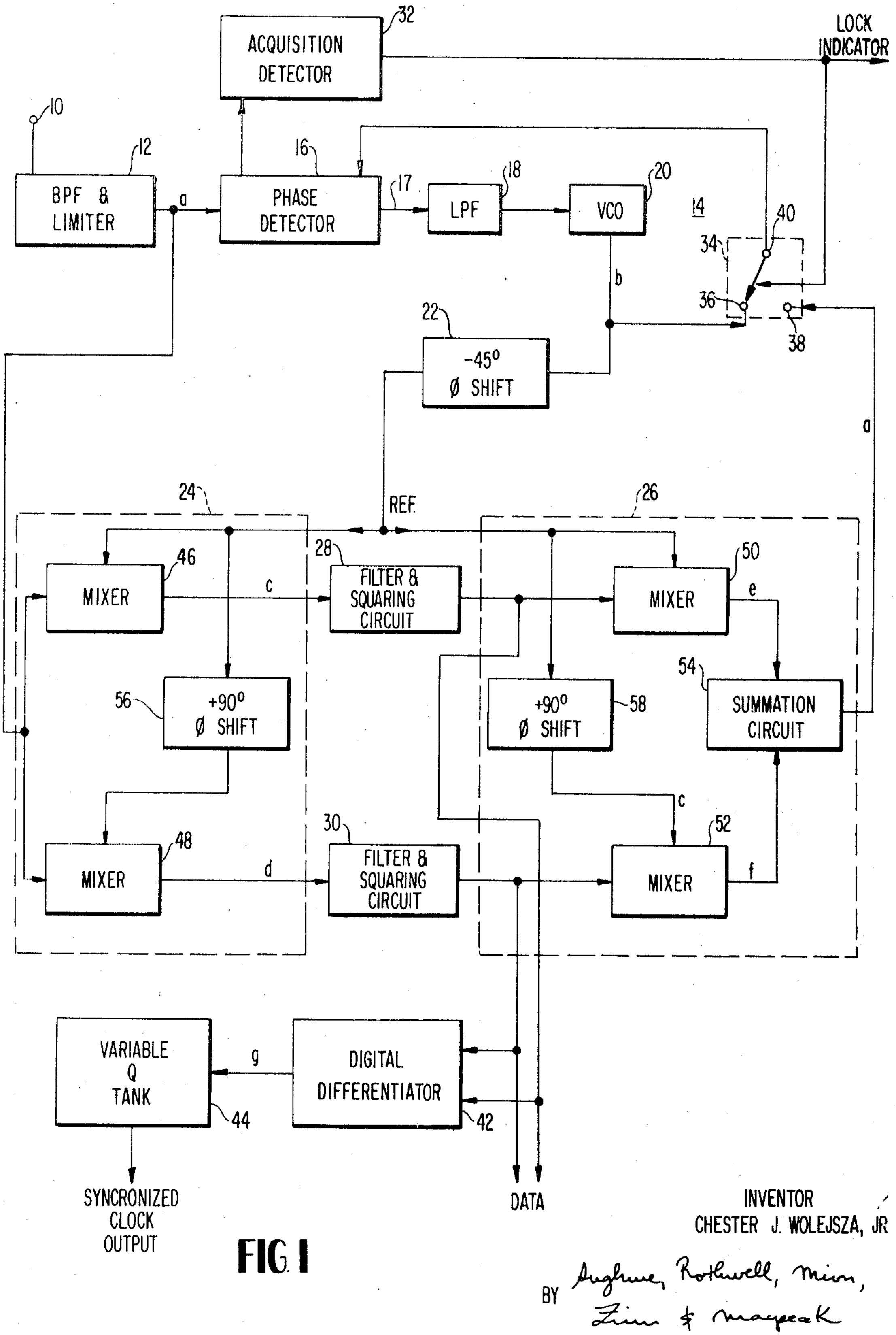
FIG. 1 is a block diagram of a preferred embodiment of the present invention.

Referring to FIG. 1, the incoming carrier is received at terminal 10 and applied through a band-pass filter and limiter 12 to a phase-locked loop 14. The phase-locked loop 14 comprises a phase detector 16, which may be any conventional phase-locked loop phase detector, but is preferably a phase detector of the type described in the copending U.S. application of Chester J. Wolejsza, Jr., Ser. No. 838,189, entitled Phase Lock Loop, filed July 1, 1969, and assigned to the assignee of the present application, a low-pass filter 18, and a voltage-controlled oscillator 20 tuned to the carrier frequency. The output of the voltage-controlled oscillator 20 is connected as one input to phase detector 16 via a switching means 34, the other input to the phase detector 16 being the received carrier. The switching means 34 has two input terminals 36, 38 and a single output terminal 40. The switching means 34 is preferably an electronic switch of the break before make type. Switching means 34 initially connects input terminal 36 to the output terminal 40.

An acquisition detector 32 applies a switching signal to the switching means 34 which disconnects input terminal 36 from output terminal 40 and connects input terminal 38 to the output terminal 40. The switching of switching means 34 places a remodulator or quadriphase modulator 26 into the loop between the VCO output and the phase detector 16. The quadriphase modulator 26 comprises a pair of mixers 50 and 52, a 90° phase shifter 58, and a summation circuit 54. Mixers 50 and 52 may be conventional ring modulators. A phase shifter 22 phase shifts the VCO output −45° and connects the phase shifted locally generated reference signal to the quadriphase modulator 26.

The phase shifted locally generated reference signal is also applied to a demodulator 24 which demodulates the received carrier. The demodulator 24 in the inverse of quadriphase modulator 26 and includes mixers 46 and 48 and a 90° phase shifter 56. The mixers 46 and 48 may be conventional ring modulators. Each of the two outputs from demodulator 24, representing a pair of bilevel outputs, is applied via a filter and squaring circuit, 28 or 30, to the quadriphase modulator 26.

The bilevel signals detected by the demodulator 24 represent the parallel data streams carried by the received quadriphase modulated carrier. The bilevel signals are applied to a differentiator 42 which generates an output pulse in response to each transition of a bilevel signal. The output pulses are applied to a variable Q tank 44 which may be an LC tank circuit tuned to a frequency equal to the bit rate or an integral multiple of the bit rate. The digital differentiator and variable Q tank 44 operate to synchronize the output frequency of the variable Q tank 44 to the received data, thereby providing a synchronized clock output. The need for synchronized clock output in any demodulator receiver apparatus is well known and will not be discussed further herein.

Figure 5:
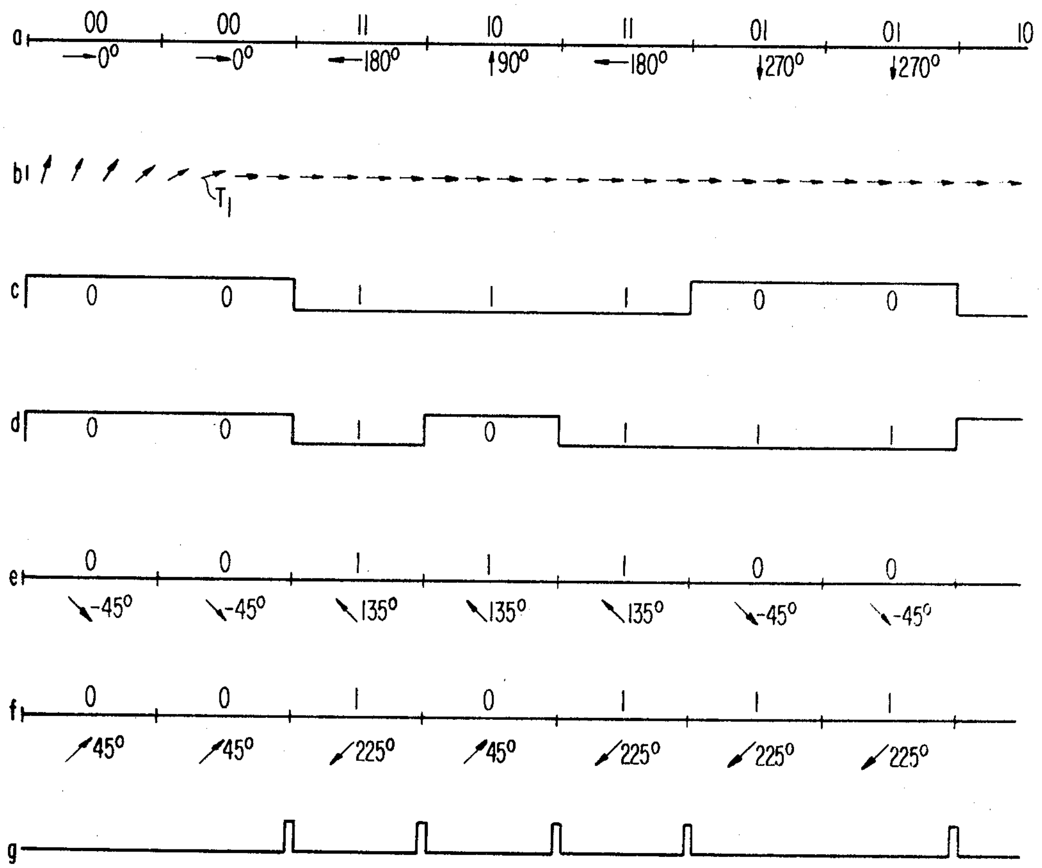
FIG. 5 is a series of phase diagrams, bilevel signals, and pulse streams representing respectively the phases, output levels, and time of occurrence of signals appearing at certain points within the apparatus of FIG. 1.

In describing the operation of FIG. 1, reference is made to FIG. 5 wherein the individual diagrams *a* through *g*, represent characteristics of the signals appearing on the lines in FIG. 1 bearing the corresponding letters *a* through *g*. Diagram *a* of FIG. 5 represents the phase of the received carrier and the two data bit binary sequence represented by the respective phase. As mentioned above, it is assumed the system operates in connection with a quadriphase modulated carrier which is preceded by a short period of unmodulated carrier. The short period of unmodulated carrier is illustrated in diagram *a* by the first two symbol periods, during which the carrier is received at 0° phase. During this time, the output of voltage control oscillator 20, which is tuned to the carrier frequency, will be connected directly to the phase detector 16 by switching means 34. As is well known in the art of phase-locked loops, the loop operates to control the phase of the VCO output to lock in phase the two inputs of phase detector 16. The initial condition is illustrated by diagram *b* which represents the phase of the locally generated carrier signal. Initially it is assumed that the locally generated carrier signal from the VCO 20 is at some arbitrary phase e.g. 58° , with respect to the phase of the incoming signal. The phase error voltage generated by phase detector 16 on output line 17 brings the locally generated reference carrier in phase with the received carrier at time $T_1$ as indicated in diagram *b* of FIG. 5. When phase coincidence occurs, the phase detector 16 provides a signal to the acquisition detector 32, which may be a voltage of predetermined level, indicating the condition of a phase lockup. The acquisition detector 32 provides an output of the switching means 34 to switch the remodulator 26 into the phase-locked loop. At the time of switching, the signals on terminals 36 and 38 will be identical in phase and frequency.

Figure 3:
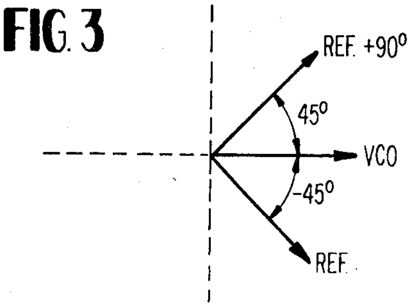
FIG. 3 is a phasor diagram representing the phase relation of the locally generated reference signals in the embodiment of FIG. 1.

The locally generated carrier from the VCO 20 is illustrated in FIG. 3 by the VCO phasor. This signal is shifted −45° by the phase shifter 22 thereby generating the signal represented by the phasor REF in FIG. 3. The REF phase carrier is applied as one input to mixer 46, and applied as one input to mixer 48 after being shifted by 90°. The 90° shifted REF phase carrier is illustrated by the corresponding phasor in FIG. 3. Mixers 46 and 48 operate to provide high-level outputs, representing zero binary bits, when the two input signals are equal in frequency but out of phase by 45° and to provide low-level outputs, representing binary one bits, when the two input signals are equal in frequency and out of phase by 135°. Thus, as can be seen by comparing the phase relation between the phasors in FIG. 3 and the phasors in FIG. 2 (representing the received carrier), the bilevel output signals shown in diagrams *c* and *d* are generated.

A single example will illustrate how these bilevel signals are generated. During the third symbol period as shown in diagram *a* of FIG. 5, the received carrier has a phase of plus 180°, and this carrier is applied as one input to mixers 46 and 48. Mixer 46 also receives the reference phase which is at a −45°. Since the two input frequencies are equal but out of phase by 135° the output from mixer 46 is a low-level signal. Mixer 48 receives the locally generated carrier at the REF +90° phase, which is also 135° out of phase with the received carrier. The result is that the output of mixer 48 is also a low-level signal representing a binary one. Thus, the bilevel output signals from demodulator 24 represent the two streams of data bits "-carried" to the receiver by the quadriphase modulated carrier. The bilevel output signals are filtered to remove any of the carrier frequency passing out of the demodulator [illegible] are shaped into a square waveform. The filtering and shaping or squaring is performed in the filter and squaring circuits 28, 30.

In the remodulator 26, mixer 50 biphase modulates the locally generated carrier at the REF phase in accordance with the bilevel output signal illustrated in diagram *c* of FIG. 5, and mixer 52 biphase modulates the locally generated carrier at phase REF +90° in accordance with the bilevel output signal illustrated in diagram *d* of FIG. 5. A binary zero level applied to either of the mixers passes the carrier unshifted to the summation circuit 54 whereas a binary one level signal applied to either of the mixers 50 and 52 phase shifts the carrier by 180°The phase characteristics of the outputs from mixers 50 and 52 are illustrated in diagrams *e* and *f*, respectively, of FIG. 5. At the output of mixer 50 a binary zero is represented by a −45° phasor and a binary one is represented by a +135° phasor; at the output of mixer 52 a binary zero is represented by a +45° phasor and a binary one is represented by a +225° phasor. The phasors illustrating the phase of the carrier at the outputs of mixers 50 and 52 are shown by the solid arrows in FIG. 4, where $Q_1$ corresponds to the REF phase of FIG. 3 and $Q_2$ corresponds to the REF 90° phase of FIG. 3.

Figure 4:
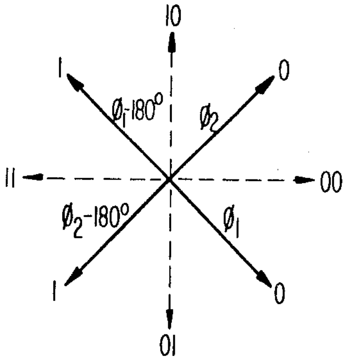
FIG. 4 is a phasor diagram representing the phase relationship of the biphase modulated signals and the quadriphase modulated signal appearing at terminals of the remodulator of FIG. 1.

The biphase inputs to summation circuit 54 are identical in frequency and are combined to provide a quadriphase output having four phases as illustrated by the dashed phasors at 0°, 90°, 180°, and 270°, of FIG. 4. It will be noted that the output of summation circuit 54 is represented by diagram *a* of FIG. 5 which also represents the received carrier. Following acquisition, these two identical frequency, inphase signals will be applied to the phase detector 16. Despite changes in the phase of the received signal following acquisition, the VCO output remains at a constant phase to thereby continuously serve as the reference for detecting and demodulating the received signal.

The bilevel output signals *c* and *d* represent the detected data and are applied to the digital differentiator 42 resulting in output pulses illustrated by diagram *g* of FIG. 5. Each output pulse energizes the variable Q tank which is tuned to the bit rate frequency or an integral multiple of the bit rate frequency. Circuits of this type are known in the art and they operate to synchronize their output frequency with the input trigger pulses. It will be noted that in the bilevel signals at the demodulator output a binary zero is represented by a high level whereas a binary one is represented by a low level. If the reverse situation is desirable for decoding the data, the bilevel output signals may be applied to inverters.

Although the apparatus illustrating FIG. 1 includes separate 90° phase shifter for the demodulator 24 and remodulator 26, it will be apparent that a single 90° shifter would serve both.

What I claim is:

1. A quadriphase detector for detecting data represented by a received quadriphase modulated carrier comprising:

a. a phase-locked loop responsive to a signal applied thereto for generating a coherent carrier signal having a fixed phase relation to said signal, b. means for applying said received quadriphase modulated carrier to said phase-lock loop, c. demodulation means having said received quadriphase modulated carrier and said coherent carrier applied thereto, for generating a pair of outputs corresponding to data bits represented by said received quadriphase modulated carrier, d. quadriphase modulation means, having said pair of outputs and said coherent carrier applied thereto, for modulating said coherent carrier in accordance with said data bits, and e. acquisition detection means connected to said phase-locked loop for inserting said quadriphase modulation means in said phase-locked loop when said coherent carrier is phase locked with said received carrier.

2. A quadriphase detector as claimed in claim 1 wherein said phase-locked loop comprises, a. a phase detector means for detecting the phase of two inputs applied thereto, one of said inputs being said received carrier, b. a voltage-controlled oscillator means, tuned to said received carrier frequency and connected to said phase detector, for generating a coherent carrier signal having a phase controlled by said phase detector output, said coherent carrier signal being connected as the other input to said phase detector, and wherein said acquisition detection means comprises switching means connected to said phase detector and responsive to the inputs to said phase detector being at a preset phase relationship for disconnecting said oscillator output from said phase detector input and connecting the output of said modulation means to said phase detector input.

3. A quadriphase detector as claimed in claim 2 wherein said demodulation means comprises, a. first means responsive to two equal frequency inputs for generating a bilevel output dependent upon the phase relation of said two inputs, b. second means responsive to two equal frequency inputs for generating a bilevel output dependent upon the phase relation of said two inputs, c. means for applying a reference carrier, having a fixed phase with respect to the output of said oscillator, as one input to said first means, d. means for applying a shifted reference carrier, having a phase quadrature relation to said reference carrier, as one input to said second means, and e. means for applying said received quadriphase modulated carrier as the second input to said first and second means.

4. A quadriphase detector as claimed in claim 3 wherein said quadriphase modulation means comprises, a. first modulating means, connected to said bilevel output of said first means, for biphase modulating a signal connected to an input thereof.

b. second modulating means, connected to said bilevel output of said second means, for biphase modulating a signal connected to an input thereof, c. means for applying a reference carrier, having a fixed phase with respect to the output of said oscillator, as the input to said first modulating means, d. means for applying a shifted reference carrier, having a phase quadrature relation to said reference carrier, as the input to said second modulating means, and e. summation means for summing the biphase modulated carriers from said first and second modulating means, said summation means output being a quadriphase modulated signal.

5. A quadriphase detector as claimed in claim 4 further comprising:

a. a variable Q tank circuit tuned to an integer multiple of said data bit rate, b. differentiating means, connected to said bilevel outputs from said first and second means, for generating an output pulse in response to each data bit transition in said bilevel outputs, and c. means connecting said output pulses to said tank circuit to thereby synchronize said tank circuit frequency with said data bit rate.